I. E. SHUMAKER & J. S. MOORHEAD.
BAG-HOLDER.
No. 178,682. Patented June 13, 1876.
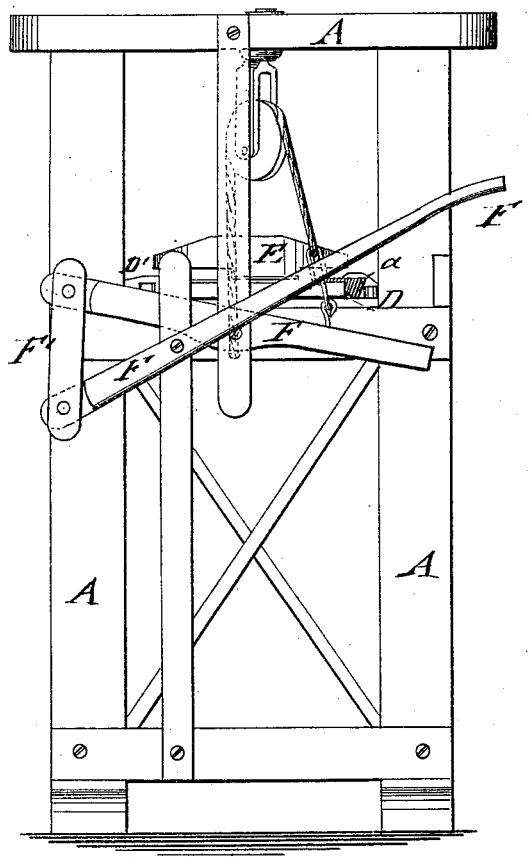
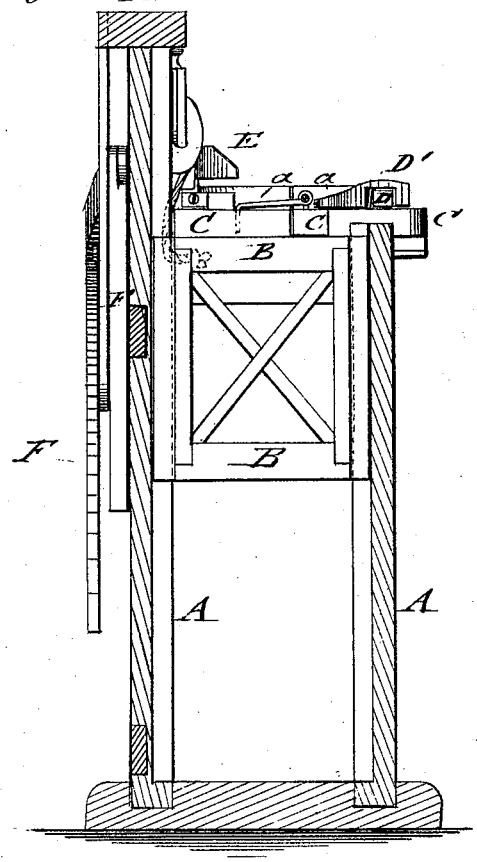
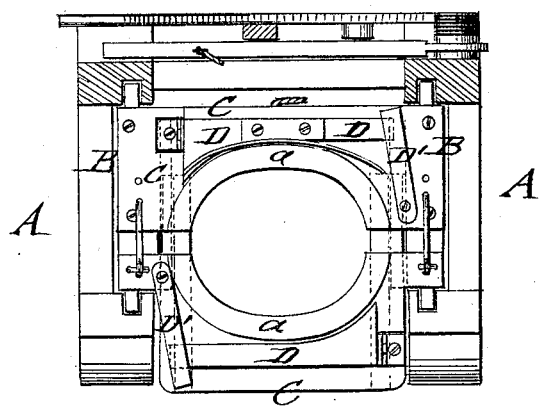
WITNESSES:
Francis McArdle.
John Goethals
INVENTOR:
I. E. Shumaker
J. S. Moorhead
BY
ATTORNEYS.

UNITED STATES PATENT OFFICE.

ISAAC E. SHUMAKER AND JOHN S. MOORHEAD, OF KELLERSBURG, PA.

IMPROVEMENT IN BAG-HOLDERS.

Specification forming part of Letters Patent No. 178,682, dated June 13, 1876; application filed April 25, 1876.

*To all whom it may concern:*

Be it known that we, ISAAC E. SHUMAKER and JOHN S. MOORHEAD, of Kellersburg, in the county of Armstrong and State of Pennsylvania, have invented a new and Improved Bag-Holder, of which the following is a specification:

In the accompanying drawing, Figure 1 represents a rear elevation of our improved bag-holder for filling grain into the bags. Fig. 2 is a vertical transverse section, and Fig. 3 is a top view of the same.

Similar letters of reference indicate corresponding parts.

The object of our invention is to furnish to farmers and others an improved bag-holder, that packs the grain tightly into any size of sack while filling the same, admitting the firm holding and easy shaking of the sack.

The invention consists of a sliding bag-holding frame, that is adjustable to different widths and lengths of sacks, and raised and dropped during filling by a hoisting double-lever mechanism.

In the drawing, A represents an upright supporting-frame, of suitable strength, whose corner-posts are grooved, to guide the adjustable bag-holding frame B in vertical direction, to set it to different sizes of sacks, so that the lower part of the sack touches the bottom during filling. The top part of the bag-holding frame B is made of two sections, C, of which the front section is made movable to slide outward, the sections being held in position by fastening-hooks or other devices. Each section C has a raised rim, *a*, with outer tapering part around the opening for the bag, on which rim the upper end of the sack is placed, after the top sections C have been adjusted to the width of the sack. The overlapping edge of the sack is clamped to the rims *a* by clamp-pieces D, which are hinged at opposite sides to each top section C, and locked to the sack by being swung down to the side of the rim, and returned at the ends by a pivoted lock-piece, D'. A guard or shield, E, of the rear clamp-pieces prevents the dropping of corn at the rear of the frame during the filling.

When the sack is partly filled it is raised and dropped by a double-lever mechanism, F, connected by link F' at the rear of the main frame, as shown in Fig. 1, the levers being connected by a cord rising over a pulley at the top of the extension of main frame to the bag-holding frame.

The double-lever mechanism raises the sack, while the weight of the grain pulls the same down again, the jerks producing the settling and packing of the grain in the sacks.

When the sack is filled the clamp-pieces are loosened by releasing the catches or lock-pieces, and by pressing down the lever the bag-frame is raised, and the bag loosened and detached, ready to be closed and removed. The bag-holding frame slides upward in the main frame for supporting larger bags, in which case the raising-cord may be shortened at the end below the top section.

The double-lever mechanism gives the required power to lift heavy grain-bags and retain them in hoisted position, so that the largest size of bags may be filled and packed by any one with great facility and perfection.

Having thus described our invention, what we claim as new, and desire to secure by Letters Patent, is—

1. A bag-holder made of adjustable rimmed sections, with hinged clamp-pieces and lock-pieces, to bind securely top edge of bag, substantially as and for the purpose specified.

2. The combination of the sliding bag-holding frame, adjustable to different heights in the main frame, with a cord, pulley, and double-lever mechanism to jerk and pack sack during filling, substantially as and for the purpose specified.

ISAAC E. SHUMAKER.
JOHN S. MOORHEAD.

Witnesses:
E. C. MOORHEAD,
J. R. SHOEMAKER.